(12) United States Patent
Kobayashi et al.

(10) Patent No.: US 11,321,794 B2
(45) Date of Patent: May 3, 2022

(54) SERVER DEVICE, TRUNK SHARE SYSTEM, INFORMATION PROCESSING METHOD, AND NON-TRANSITORY COMPUTER-READABLE MEDIUM STORING INFORMATION PROCESSING PROGRAM

(71) Applicant: TOYOTA JIDOSHA KABUSHIKI KAISHA, Toyota (JP)

(72) Inventors: Yasumasa Kobayashi, Nagoya (JP); Ryuichi Suzuki, Nagakute (JP); Yuki Ito, Iwakura (JP); Hiroyasu Shiokawa, Nagoya (JP); Naoki Yamamuro, Nagoya (JP); Makoto Akahane, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/228,095

(22) Filed: Apr. 12, 2021

(65) Prior Publication Data
US 2021/0233195 A1     Jul. 29, 2021

Related U.S. Application Data

(62) Division of application No. 16/211,299, filed on Dec. 6, 2018, now Pat. No. 11,010,853.

(30) Foreign Application Priority Data

Dec. 13, 2017 (JP) .............................. JP2017-238750

(51) Int. Cl.
*G06Q 50/28* (2012.01)
*B60R 25/24* (2013.01)

(52) U.S. Cl.
CPC ............. *G06Q 50/28* (2013.01); *B60R 25/24* (2013.01); *B60R 2325/10* (2013.01); *B60R 2325/205* (2013.01)

(58) Field of Classification Search
None
See application file for complete search history.

(56) References Cited

U.S. PATENT DOCUMENTS 9,635,006 B2 * 4/2017 Oz ......................... H04W 4/02
9,821,768 B2   11/2017 Oz
(Continued)

FOREIGN PATENT DOCUMENTS

| CN | 107077654 A | 8/2017 |
| JP | 2006-206225 | 8/2006 |
| JP | 2015-169008 | 9/2015 |

*Primary Examiner* — Carlos Garcia
(74) *Attorney, Agent, or Firm* — Oblon, McClelland, Maier & Neustadt, L.L.P.

(57) ABSTRACT

A server device includes a processor configured to i) acquire vehicle information when a delivery request is made; ii) acquire predetermined authentication information for unlocking and locking a door of a vehicle, based on the acquired vehicle information; iii) transmit the acquired predetermined authentication information to a delivery terminal; and iv) to acquire predetermined proof information for proving that a user of the vehicle is a rightful recipient of a delivery article, by communicating with a user terminal. The processor is configured to transmit the acquired predetermined authentication information to the delivery terminal, on a condition that the predetermined proof information is acquired.

2 Claims, 6 Drawing Sheets

(56) References Cited

U.S. PATENT DOCUMENTS

| | | |
|---|---|---|
| 10,002,479 B2 | 6/2018 | Oz |
| 10,553,056 B2 | 2/2020 | Shirai |
| 10,573,110 B2 | 2/2020 | Tsujimura |
| 10,752,208 B2 | 8/2020 | Sakurada |
| 10,810,814 B2* | 10/2020 | Sakurada ............ G07C 9/00896 |
| 2015/0332531 A1 | 11/2015 | Davidsson |
| 2016/0096508 A1 | 4/2016 | Oz |
| 2016/0099927 A1* | 4/2016 | Oz ........................ G07C 5/0808 726/9 |
| 2017/0024693 A1* | 1/2017 | Wiechers .............. H04W 12/08 |

* cited by examiner

FIG. 4

| USER ID | DELIVERY DATE AND TIME | DELIVERY PLACE | DELIVERY STATUS | CONFIRMATION OF DELIVERY SUITABILITY |
|---|---|---|---|---|
| S001 | 01/11/2017 | VEHICLE | COMPLETED | REQUIRED |
| S002 | 02/11/2017 | DOMICILE | COMPLETED | NOT REQUIRED |
| S003 | 03/11/2017 | VEHICLE | NOT COMPLETED | REQUIRED |

FIG. 5

| USER ID | VEHICLE TYPE | COLOR | LICENSE PLATE | VEHICLE POSITION |
|---|---|---|---|---|
| S001 | ... | WHITE | XXYY | ... |

VEHICLE SPECIFICATION INFORMATION

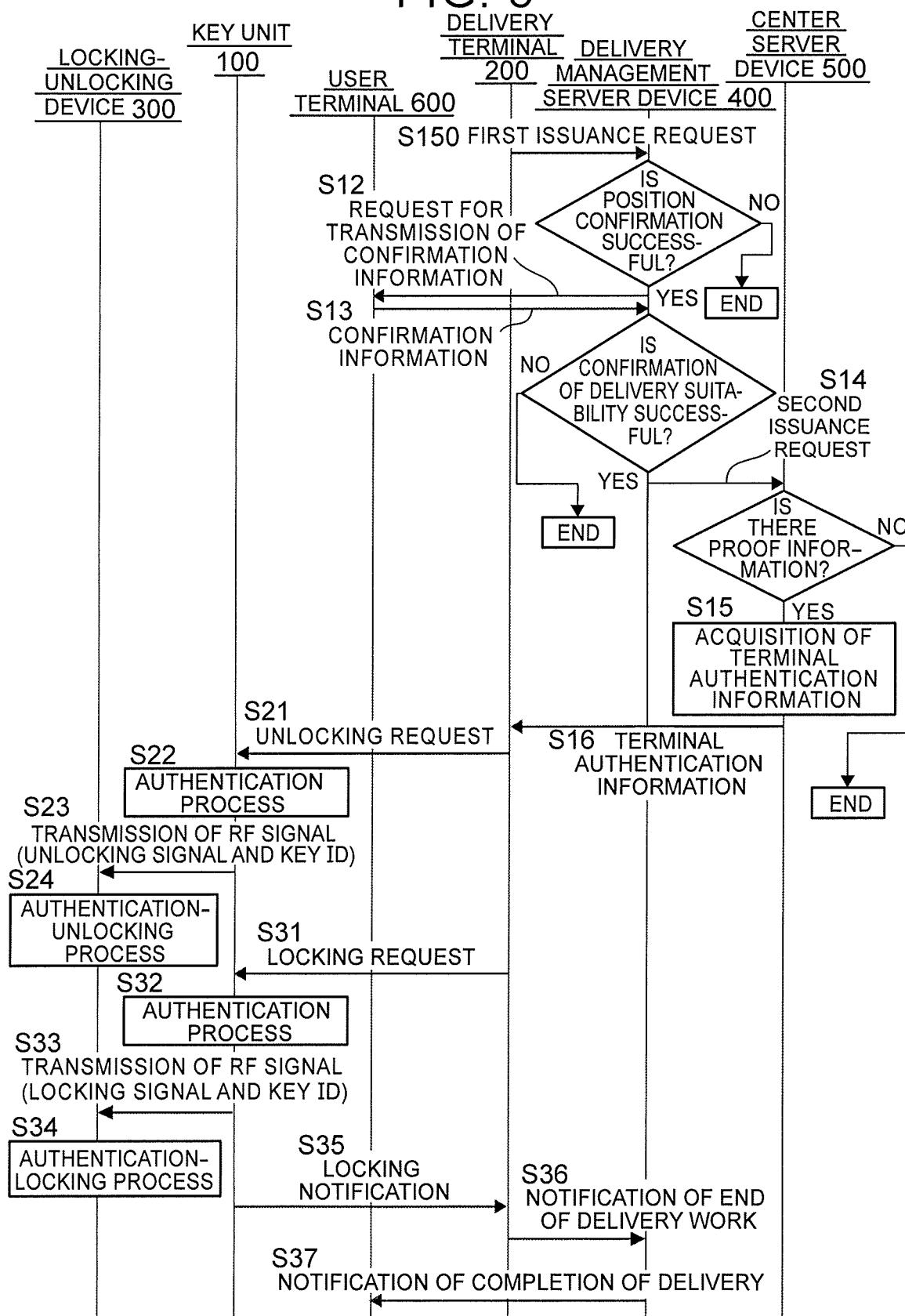

1

SERVER DEVICE, TRUNK SHARE SYSTEM, INFORMATION PROCESSING METHOD, AND NON-TRANSITORY COMPUTER-READABLE MEDIUM STORING INFORMATION PROCESSING PROGRAM

INCORPORATION BY REFERENCE

This application is a division of U.S. application Ser. No. 16/211,299, filed Dec. 6, 2018, which claims the benefit of priority of Japanese Patent Application No. 2017-238750 filed on Dec. 13, 2017, the contents of each of which are incorporated herein by reference in their entirety.

BACKGROUND

1. Technical Field

The disclosure relates to a server device, a trunk share system, an information processing method, and a non-transitory computer-readable medium storing an information processing program that are associated with a delivery service utilizing the interior of a vehicle as a place for receiving a delivery article.

2. Description of Related Art

In recent years, the development of a trunk share system has been in progress, as a system that allows a deliverer and a recipient to efficiently deliver and receive a delivery article. In the trunk share system, the interior of a vehicle designated by the recipient (e.g., a space that is made accessible by unlocking and opening a lockable-unlockable door, such as a cabin space for accommodating a driver and a passenger during a ride in the vehicle, or a luggage space for storing luggage) is utilized as a place where the delivery article is delivered. For example, in Japanese Patent Application Publication No. 2006-206225 (JP 2006-206225 A), there is proposed a system that enables the locking-unlocking of a designated vehicle in the case where an authentication process between a terminal of a deliverer and an on-board unit mounted in the designated vehicle is successful when the deliverer carries out delivery work.

SUMMARY

The delivery articles handled by the trunk share system as described above may include a delivery article that requires confirmation that the recipient is a rightful recipient of the delivery article (for example, confirmation that the recipient agrees to receiving the delivery article, confirmation of the recipient's identity, and confirmation regarding the settlement of the payment on delivery, which may be referred to hereinafter as "confirmation of delivery suitability"), such as a registered mail or a cash-on-delivery article. In the case where a delivery article that requires confirmation of delivery suitability is handled in the trunk share system, authentication information that is needed to perform an authentication process between the terminal of the deliverer and the on-board unit of the designated vehicle may be given to the terminal of the deliverer in a state where the above-mentioned delivery suitability has not been confirmed. In this case, inconveniences, such as the delivering of the delivery article against the recipient's will, the delivering of the delivery article to someone other than the rightful recipient, and the delivering of the delivery article with the payment on delivery unsettled, may be caused. As a result, it may become difficult to appropriately carry out delivery work for the delivery article.

The disclosure provides a technique that is effective in appropriately carrying out delivery work for a delivery article that requires confirmation of delivery suitability when the interior of a vehicle is utilized as a place where the delivery article is delivered.

In an aspect of the disclosure, when a delivery article that requires confirmation of delivery suitability is delivered into the interior of a vehicle, authentication information is issued to a terminal of a deliverer on the condition that predetermined proof information for proving that a user of the vehicle is a rightful recipient of the delivery article is acquired. That is, when the delivery article is delivered into the interior of the vehicle, no authentication information is issued to the terminal of the deliverer unless the delivery suitability is confirmed. "The interior of the vehicle" mentioned herein is a space that can be accessed by unlocking and opening a lockable-unlockable door, such as a cabin space as a space for accommodating a driver and a passenger during a ride in the vehicle, or a luggage space as a space for storing luggage.

A first aspect of the disclosure relates to a server device including a processor configured to i) acquire vehicle information including information for identifying a vehicle when a delivery request as a request for delivery of a delivery article into an interior of the vehicle is made; ii) acquire predetermined authentication information for unlocking and locking a door of the vehicle, based on the acquired vehicle information; iii) transmit the acquired predetermined authentication information to a delivery terminal that is used by a deliverer who carries out delivery work for the delivery article; and iv) to acquire predetermined proof information for proving that a user of the vehicle is a rightful recipient of the delivery article, by communicating with a user terminal that is used by the user. The processor is configured to transmit the acquired predetermined authentication information to the delivery terminal, on a condition that the predetermined proof information is acquired.

In the server device, when the request for delivery of the delivery article into the interior of the vehicle is made, the processor acquires the vehicle information including the identification information on the vehicle. The processor acquires the predetermined authentication information for unlocking and locking the door of the vehicle, based on the acquired vehicle information. The processor acquires the predetermined proof information for proving that the user is the rightful recipient of the delivery article, by communicating with the user terminal that is used by the user of the vehicle as the delivery destination. The predetermined proof information mentioned herein is information for proving that the user of the vehicle as the delivery destination has been confirmed to be the rightful recipient of the delivery article in confirming the delivery suitability. The predetermined proof information is, for example, information proving that the user has agreed to receiving the delivery article (e.g., information proving that the user's digital signature, digital seal or the like has been acquired), information proving that the user is the true recipient of the delivery article (e.g., information proving that a collation between the user's digital signature, digital seal, or biological information and the recipient's signature, seal or biological information registered in advance has been successful), or information proving that the user has settled the payment on delivery.

When the processor acquires the predetermined proof information, the processor transmits the acquired predetermined authentication information to the delivery terminal of the deliverer who carries out delivery work for the delivery article. When the delivery terminal receives the predetermined authentication information, the unlocking operation for the door of the vehicle (i.e., the operation for unlocking the door of the vehicle) is allowed to be performed on the delivery terminal. Thus, the deliverer can open the door of the vehicle and store the delivery article into the interior thereof. When the locking operation for the door of the vehicle (i.e., the operation for locking the door of the vehicle) is performed on the delivery terminal after the end of this operation (after the closing of the door), the door is locked.

The processor does not transmit the acquired predetermined authentication information to the delivery terminal of the deliverer who carries out delivery work for the delivery article, unless the processor acquires the predetermined proof information. In this case, the locking-unlocking operation for the door of the vehicle (i.e., the operations for unlocking and locking the door of the vehicle) cannot be performed on the delivery terminal. That is, in the case where the delivery article requires confirmation of the delivery suitability, it is possible to prevent a situation where the predetermined authentication information is given to the delivery terminal when the delivery suitability is unconfirmed. Thus, inconveniences, such as the delivering of the delivery article against the user's will, the delivering of the delivery article to someone other than the rightful recipient, and the delivering of the delivery article with the payment on delivery unsettled, are unlikely to be caused. The server device according to the above-mentioned aspect may include a plurality of server devices each of which includes a processor, and the processors of the plurality of server devices may be configured to perform the above-mentioned processes.

Accordingly, the server device according to the above-mentioned aspect of the disclosure makes it possible to appropriately carry out delivery work for the delivery article when the delivery article requires confirmation of the delivery suitability, in the case where the delivery article is delivered into the interior of the vehicle.

In the server device according to the above-mentioned aspect, the processor may be configured to i) make a request for transmission of confirmation information to the user terminal when the delivery request is made, the confirmation information being information needed to confirm that the user is the rightful recipient of the delivery article; and ii) confirm whether the user is the rightful recipient of the delivery article, based on the confirmation information that is transmitted from the user terminal in response to the request for transmission of the confirmation information. In this case, the processor may be configured to acquire the predetermined proof information on a condition that the processor confirms that the user is the rightful recipient of the delivery article. The confirmation information mentioned herein is information that is needed to confirm the delivery suitability. The confirmation information is information that is needed to confirm that the user has agreed to receiving the delivery article (e.g., information on the user's digital signature, or digital seal), information that is needed to confirm that the user is the true recipient of the delivery (identification) (e.g., the user's digital signature, digital seal, or biological information), or information that is needed to settle the payment on delivery (e.g., information on the password necessary for debiting a collectible fee from the user's saving account or the like, or the number of the user's credit card).

In this configuration, when the delivery request as the request for delivery of the delivery into the interior of the vehicle is made, the processor makes the request for transmission of confirmation information to the user terminal. If the user agrees to receiving the delivery article or wishes to receive the delivery article when the user terminal receives the request for transmission of the confirmation information, the user performs the operation for transmitting the confirmation information, on the user terminal. Then, upon receiving the confirmation information that is transmitted from the user terminal, the processor confirms, based on the confirmation information, whether the user is the rightful recipient of the delivery article. Thus, if the user is confirmed to be the rightful recipient of the delivery article, the processor acquires the predetermined proof information. As a result, the processor transmits the predetermined authentication information to the delivery terminal, and thus, the locking-unlocking operation for the door of the vehicle (i.e., the operations for unlocking and locking the door of the vehicle) can be performed on the delivery terminal. Accordingly, the deliverer can store the delivery article into the interior of the vehicle. If the user does not agree to receiving the delivery article, or does not wish to receive the delivery article when the user terminal receives the request for transmission of the confirmation information, the operation for transmitting the confirmation information is not performed on the user terminal. Thus, the processor does not acquire the predetermined proof information. As a result, the processor does not transmit the predetermined authentication information to the delivery terminal, and accordingly, the locking-unlocking operation for the door of the vehicle (i.e., the operations for unlocking and locking the door of the vehicle) cannot be performed on the delivery terminal. Thus, it is possible to prevent a situation where the delivery article is delivered into the interior of the vehicle against the user's will. Even when the user performs, on the user terminal, the operation for transmitting the confirmation information, the processor does not acquire the predetermined proof information unless the processor confirms that the user is the rightful recipient of the delivery article. As a result, the processor does not transmit the predetermined authentication information to the delivery terminal, and thus, the locking-unlocking operation for the door of the vehicle cannot be performed on the delivery terminal. Thus, it is possible to prevent a situation where, for example, the delivery article is delivered to someone other than the rightful recipient, or the delivery article is delivered with the payment on delivery unsettled.

The above-mentioned aspect of the disclosure is also applicable to a case where the vehicle is provided with an on-board unit configured to accept a locking-unlocking request from the delivery terminal on the condition that authentication of the delivery terminal is successful. A locking request and an unlocking request are collectively referred to as the locking-unlocking request. In this case, the processor may be configured to transmit, to the delivery terminal, the information that is used by the on-board unit to authenticate the delivery terminal, as the predetermined authentication information. In this configuration, unless the on-board unit succeeds in the authentication of the terminal, the terminal cannot perform the locking-unlocking operation for the door of the vehicle. Therefore, it is possible to prevent a situation where the locking-unlocking operation for the door of the vehicle is performed by a terminal other than the rightful delivery terminal.

The on-board unit may be configured to authenticate the delivery terminal through short-distance wireless communication. If the on-board unit and the delivery terminal are configured to be able to communicate with each other via a cellular phone network or the Internet, the delivery terminal cannot be authenticated at a place at which electric waves from cellular phones or Wi-Fi do not arrive. Accordingly, delivery work cannot be carried out. Further, there is a possibility that the delivery terminal may perform the locking-unlocking operation for the door of the vehicle when the deliverer is unable to visually observe the state of the vehicle. In contrast, in the configuration in which the on-board unit and the delivery terminal can directly communicate with each other through short-distance wireless communication, these problems do not occur. Thus, the configuration provides excellent user-friendliness and excellent security.

In the configuration in which the on-board unit authenticates the delivery terminal through short-distance wireless communication, the processor may make the request for transmission of the confirmation information to the user terminal, on a condition that the delivery terminal is located at a position where the short-distance wireless communication between the on-board unit and the delivery terminal is established. When the deliverer hands over a registered mail or a cash-on-delivery article to the recipient, the recipient's act of, for example, signing, placing the seal, or settling the payment on delivery is carried out substantially simultaneously with the deliverer's act of handing over the delivery article to the recipient. In contrast, in the case where the interior of the vehicle is utilized as a place where the delivery article is delivered and received, if a request for transmission of confirmation information is made to the user terminal before the deliverer reaches a position close to the vehicle as the delivery destination, a long time may elapse after the user performs the act of transmitting the confirmation information through the user terminal, until the deliverer delivers the delivery article into the interior of the user vehicle. Thus, in the case where the request for transmission of the confirmation information is made to the user terminal on the condition that the delivery terminal is located at a position where the short-distance wireless communication between the on-board unit and the delivery terminal is established, it is possible to reduce the possibility that a long time may elapse after the user performs the act of transmitting the confirmation information through the user terminal, until the deliverer delivers the delivery article into the interior of the user vehicle. Therefore, it is possible to improve user-friendliness.

A second aspect of the disclosure relates to a trunk share system including a delivery terminal that is used by a person that carries out delivery work for delivering a delivery article into an interior of a vehicle; a user terminal that is used by a user of the vehicle; a first server device that is configured to manage the delivery work for the delivery article; and a second server device that is configured to manage the vehicle. The delivery terminal may be configured to make a request for issuance of predetermined authentication information that is needed to unlock and lock a door of the vehicle. The first server device may be configured to make confirmation as to whether the user is a rightful recipient of the delivery article by communicating with the user terminal upon receiving the request for issuance of the predetermined authentication information from the delivery terminal, and to transmit predetermined proof information for proving that the user is the rightful recipient of the delivery article and the request for issuance of the predetermined authentication information to the second server device when the confirmation is successful. The second server device may be configured to acquire the predetermined authentication information based on vehicle information including information for identifying the vehicle, and to transmit the acquired predetermined authentication information to the delivery terminal, upon receiving the predetermined proof information and the request for issuance of the predetermined authentication information from the first server device.

In the trunk share system thus configured, the predetermined authentication information is not issued to the delivery terminal from the second server device unless the first server device confirms that the user of the vehicle is the rightful recipient of the delivery article. That is, in the case where the delivery article requires confirmation of the delivery suitability, it is possible to prevent a situation where the predetermined authentication information is given to the delivery terminal when the delivery suitability is unconfirmed. Thus, inconveniences, such as the delivering of the delivery article against the user's will, the delivering of the delivery article to someone other than the rightful recipient, and the delivering of the delivery article with the payment on delivery unsettled, are unlikely to be caused.

The disclosure may also be regarded as an information processing method including at least a part of the above-mentioned processes, an information processing program for realizing the method, or a recording medium that stores the information processing program. A third aspect of the disclosure relates to an information processing method. The information processing method includes acquiring, by a computer, vehicle information including information for identifying a vehicle, when a delivery request as a request for delivery of a delivery article into an interior of the vehicle is made; acquiring, by the computer, predetermined authentication information for unlocking and locking a door of the vehicle, based on the acquired vehicle information; transmitting, by the computer, the acquired predetermined authentication information to a delivery terminal that is used by a deliverer who carries out delivery work for the delivery article; and acquiring, by the computer, predetermined proof information for proving that a user of the vehicle is a rightful recipient of the delivery article, by communicating with a user terminal that is used by the user. The acquired predetermined authentication information is transmitted to the delivery terminal on a condition that the predetermined proof information is acquired.

A fourth aspect of the disclosure relates to a non-transitory computer-readable medium storing an information processing program causing a computer to perform operations. The operations includes acquiring vehicle information including information for identifying a vehicle, when a delivery request as a request for delivery of a delivery article into an interior of the vehicle is made; acquiring predetermined authentication information for unlocking and locking a door of the vehicle, based on the acquired vehicle information; transmitting the acquired predetermined authentication information to a delivery terminal that is used by a deliverer who carries out delivery work for the delivery article; and acquiring predetermined proof information for proving that a user of the vehicle is a rightful recipient of the delivery article, by communicating with a user terminal that is used by the user. The acquired predetermined authentication information is transmitted to the delivery terminal on a condition that the predetermined proof information is acquired.

According to each of the above-mentioned aspects of the disclosure, it is possible to provide the technique that is effective in appropriately carrying out delivery work for a delivery article that requires confirmation of delivery suitability when the interior of a vehicle is utilized as a place where the delivery article is delivered.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein:

FIG. 4 is a view showing an example of the configuration of a table of delivery information that is stored in a delivery management DB;

FIG. 5 is a view showing an example of the configuration of a table of vehicle management information that is stored in the delivery management DB;

FIG. 8 is a flowchart showing the flow of data and processes among components in a trunk share system according to a second modification example.

DETAILED DESCRIPTION OF EMBODIMENT

An embodiment of the disclosure will be described hereinafter based on the drawings. The dimensions (sizes), materials, shapes, relative arrangement and the like of component parts mentioned in the embodiment are not intended to limit the technical scope of the disclosure exclusively thereto unless otherwise specified.

Figure 1:
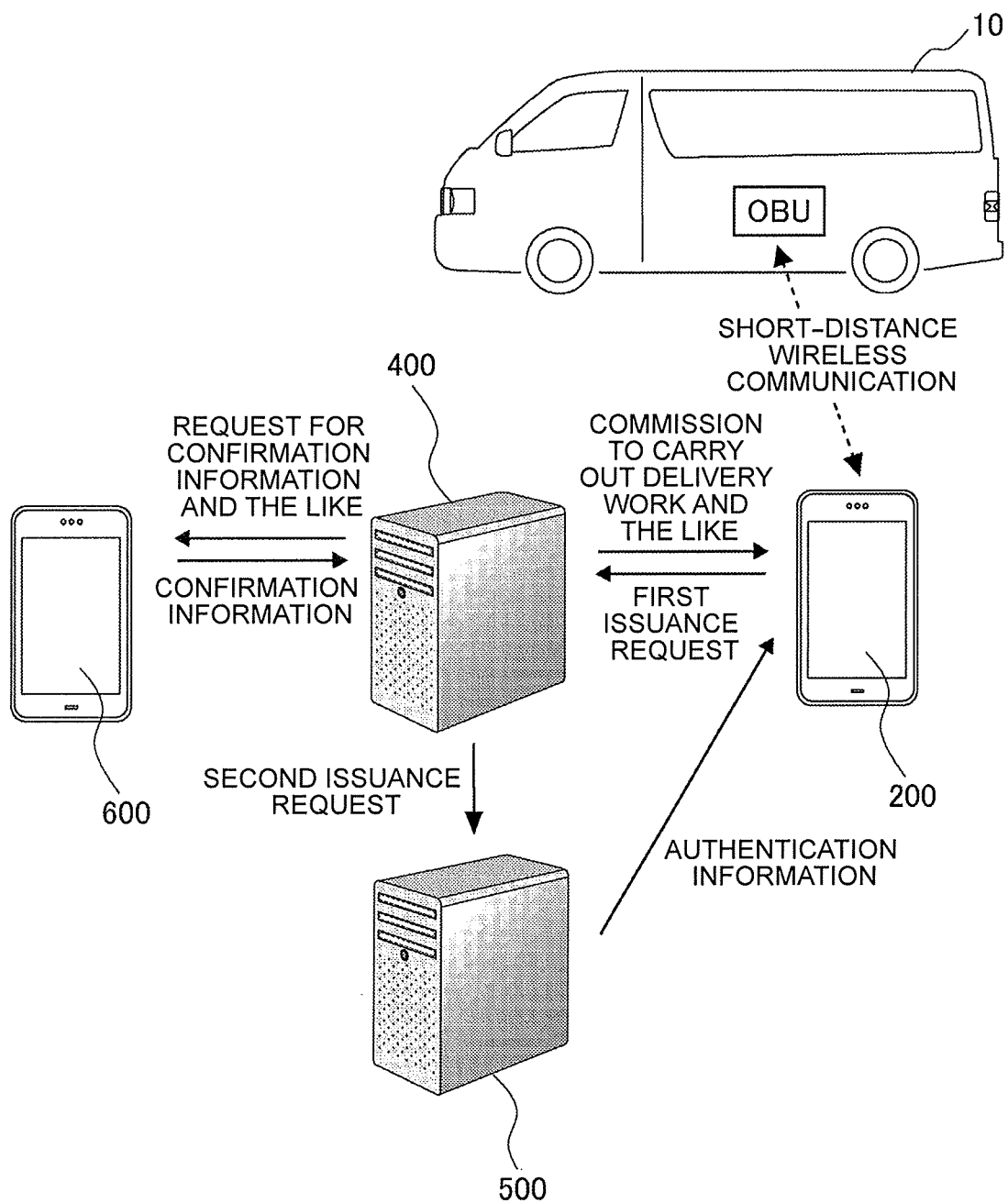
FIG. 1 is a view showing the schematic configuration of a trunk share system according to an embodiment.

The outline of a trunk share system will be described. FIG. 1 is a view showing the schematic configuration of the trunk share system according to the embodiment. The trunk share system mentioned herein is a system for realizing a delivery service that uses the interior of a vehicle as a place where a delivery article is delivered and received, by sharing the interior (e.g., a space that is made accessible by unlocking and opening a lockable-unlockable door, such as a cabin space for accommodating a driver and a passenger during a ride in the vehicle, or a luggage space for storing luggage) of the vehicle, between the recipient and a deliverer that carries out delivery work for a delivery article. The interior of the vehicle, which is shared between the recipient and the deliverer, is designated by the recipient. The term "a delivery article" in the embodiment means a delivery article that requires confirmation that the recipient is a rightful recipient thereof (i.e., a delivery article that requires confirmation of delivery suitability thereof), such as a registered mail or a cash-on-delivery article (e.g., a cash-on-delivery parcel), unless otherwise specified. As shown in FIG. 1, this trunk share system for realizing the delivery service for a delivery article includes an on-board unit OBU, a delivery terminal 200, a delivery management server device 400, a center server device 500, and a user terminal 600.

The on-board unit OBU is mounted in a vehicle (hereinafter may be referred to as "a user vehicle") 10, which is designated by a user as a recipient of a delivery article and which is possessed or rented by the user. The on-board unit OBU performs a predetermined authentication process based on predetermined authentication information that is transmitted from the delivery terminal 200, and determines, based on a result of the authentication, whether to meet a locking-unlocking request from the delivery terminal 200. In the embodiment, the interior of the user vehicle 10 provided with the on-board unit OBU is utilized as a delivery destination for a delivery article (i.e., a place where a delivery article is delivered and received).

The delivery terminal 200 is a terminal that is carried by the deliverer who actually carries out delivery work for a delivery article that is delivered and received in the interior of the user vehicle 10, or a terminal that is mounted in a vehicle (a delivery vehicle) that is used by the deliverer when carrying out delivery work. The delivery terminal 200 performs a locking-unlocking operation for doors of the user vehicle 10 by acquiring predetermined authentication information and transmitting a locking-unlocking request together with the acquired predetermined authentication information to the on-board unit OBU when the deliverer carries out delivery work.

The delivery management server device 400 is disposed in a company that has been commissioned to carry out delivery work, a company that offers to this company a service that is needed to carry out delivery work, or the like. Upon receiving a request for delivery from the user as the recipient of a delivery or a sender of the delivery article, the delivery management server device 400 confirms (determines) whether the user of the user vehicle 10 is a rightful recipient of the delivery (confirms the delivery suitability). When the user is thus confirmed to be the rightful recipient of the delivery, the delivery management server device 400 requests the center server device 500 to transmit predetermined authentication information for locking-unlocking the doors of the user vehicle 10 to the delivery terminal 200. In this case, in addition to a signal for making a request for transmission of the predetermined authentication information to the delivery terminal 200, identification information on the user as the recipient of the delivery and information (predetermined proof information) for proving that the user is the rightful recipient of the delivery are transmitted from the delivery management server device 400 to the center server device 500.

The center server device 500 identifies, based on the user identification information received from the delivery management server device 400, the user vehicle 10 associated with the user identification information, and transmits the predetermined authentication information on the identified user vehicle 10 to the delivery terminal 200. The center server device 500 transmits the predetermined authentication information to the delivery terminal 200 on the condition that the delivery management server device 400 acquires the above-mentioned predetermined proof information. More specifically, the center server device 500 transmits the predetermined authentication information to the delivery terminal 200 in response to the attachment of the above-mentioned predetermined proof information to the request from the delivery management server device 400. When the delivery terminal 200 receives the predetermined authentication information transmitted from the center server device 500, the deliverer can unlock the doors of the user vehicle 10 through the use of the delivery terminal 200. Thus, the deliver can store the delivery into the interior of the user vehicle 10. The predetermined authentication information may be transmitted from the center server device 500 to the delivery terminal 200 via the delivery management server device 400.

The user terminal 600 is a terminal that is carried by the user of the user vehicle 10. The user terminal 600 is a terminal that is used to transmit a delivery request for a delivery article to the delivery management server device 400, and to receive a notification of the completion of delivery from the delivery management server device 400. Besides, in the embodiment, the user terminal 600 is also used to transmit information necessary for confirmation of the delivery suitability to the delivery management server device 400 when the delivery management server device 400 confirms the above-mentioned delivery suitability.

Figure 2:
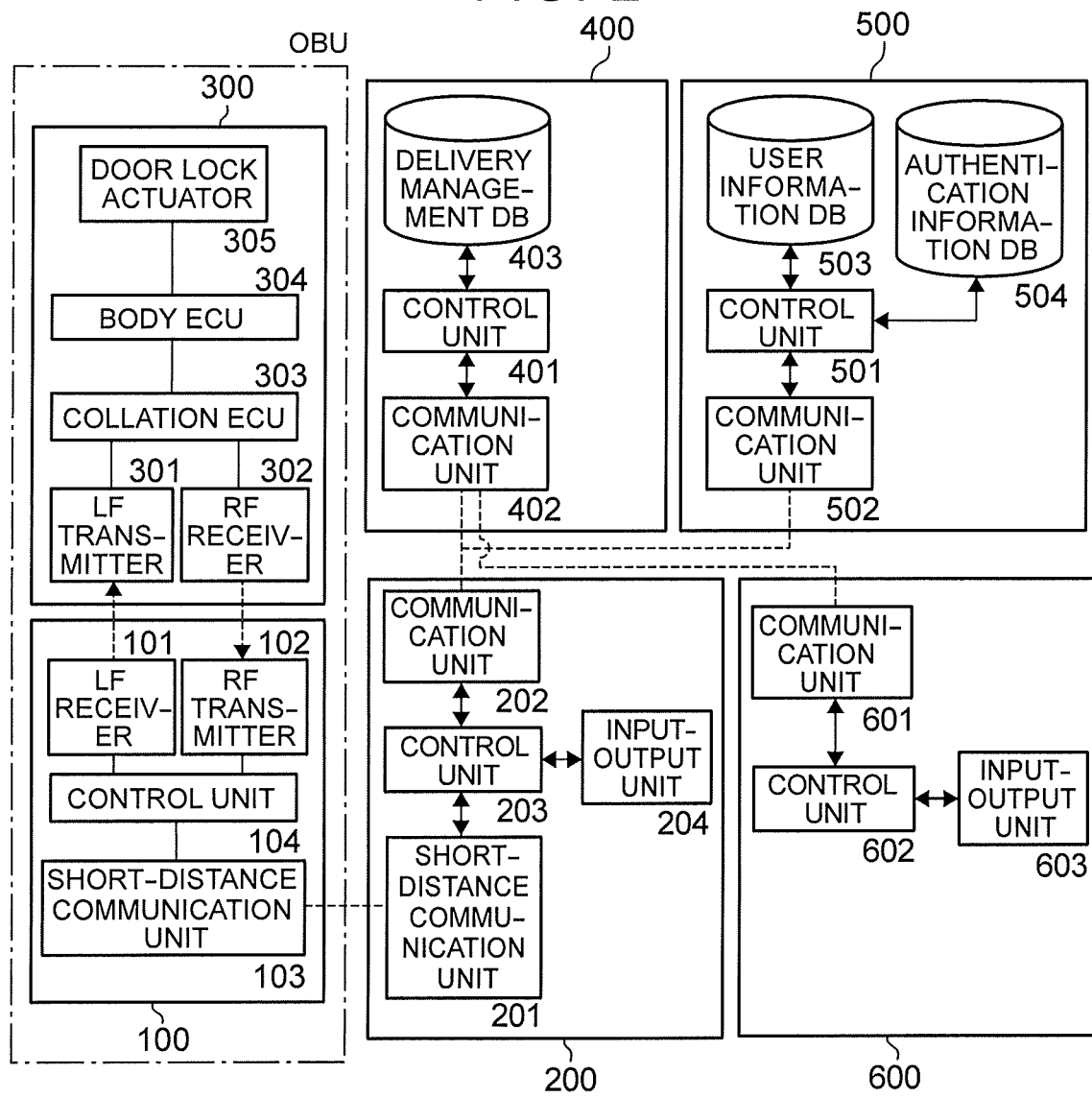
FIG. 2 is a block diagram schematically showing examples of components included in the trunk share system according to the embodiment.

A system configuration will be described. That is, the components of the above-mentioned trunk share system will be described in detail. FIG. 2 is a block diagram schematically showing example configurations of the on-board unit OBU, the delivery terminal 200, the delivery management server device 400, the center server device 500, and the user terminal 600 shown in FIG. 1.

As shown in FIG. 2, the on-board unit OBU includes a key unit 100 and a locking-unlocking device 300. The key unit 100 includes the same wireless interface as that of an electronic key (a portable device) of a smart key, and can lock/unlock the user vehicle 10 without using a physical key by communicating with the existing locking-unlocking device 300. The key unit 100 authenticates the delivery terminal 200 by establishing short-distance wireless communication (i.e., short-range wireless communication) with the delivery terminal 200, and determines, based on a result of the authentication, whether to behave as an electronic key of the user vehicle 10. The key unit 100 and the locking-unlocking device 300 are operated by an electric power that is supplied from a battery that is mounted in the user vehicle 10.

The locking-unlocking device 300 is a device for locking and unlocking the doors of the user vehicle 10, and is an existing device that constitutes a part of a smart key system. More specifically, the locking-unlocking device 300 locks and unlocks the doors of the user vehicle 10 in accordance with a locking signal and an unlocking signal, which are transmitted from the electronic key (hereinafter referred to as the portable device) possessed by the user of the user vehicle 10 via radio-frequency (hereinafter referred to as RF) electric waves. The locking-unlocking device 300 has a function of transmitting low-frequency (hereinafter referred to as LF) electric waves for searching the portable device. In the embodiment, instead of the portable device that is possessed by the user, the key unit 100 controls the locking and unlocking of the doors of the user vehicle 10 by transmitting and receiving RF electric waves and LF electric waves to and from the locking-unlocking device 300. The communication destination for the locking-unlocking device 300 (i.e., the unit with which the locking-unlocking device 300 communicates) is limited to the key unit 100, unless otherwise specified.

The concrete configurations of the locking-unlocking device 300 and the key unit 100 will now be described. First, the locking-unlocking device 300 is configured to include an LF transmitter 301, an RF receiver 302, a collation ECU 303, a body ECU 304, and a door lock actuator 305. The LF transmitter 301 is a device that transmits low-frequency (e.g., 100 to 300 KHz) electric waves for searching (polling) the key unit 100. The LF transmitter 301 is installed in the vicinity of, for example, a center console or a steering wheel in the interior of the user vehicle 10. The RF receiver 302 is a device that receives radio-frequency (e.g., 100 MHz to 1 GHz) electric waves transmitted from the key unit 100. The RF receiver 302 is installed at a certain place in the interior of the user vehicle 10.

The collation ECU 303 is a computer that performs the control of locking and unlocking the doors of the user vehicle 10, based on a signal (a locking signal or an unlocking signal) transmitted from the key unit 100 via RF electric waves. This collation ECU 303 is, for example, a microcomputer. The locking signal and the unlocking signal may be generically (collectively) referred to as a locking-unlocking signal in the following description. It should be noted, however, that the term "locking-unlocking signal" signifies at least one of the locking signal and the unlocking signal.

The collation ECU 303 authenticates the locking-unlocking signal transmitted from the key unit 100 as having been transmitted from a rightful device. More specifically, the collation ECU 303 determines whether a key ID included in the locking-unlocking signal coincides with a key ID stored in advance in a storage unit included in the collation ECU 303. Then, the collation ECU 303 transmits an unlocking command or a locking command to the body ECU 304, based on a result of this authentication. The unlocking command or the locking command is transmitted via an in-vehicle network such as Controller Area Network (CAN) or the like.

The door lock actuator 305 is an actuator that locks and unlocks the doors (the doors that are opened and closed when a person gets into and out of the cabin space, and the door that is opened and closed when a piece of luggage is loaded and unloaded into and from the luggage space) of the user vehicle 10. The door lock actuator 305 operates based on a signal transmitted from the body ECU 304. The door lock actuator 305 may be configured to be able to lock and unlock the doors for the cabin space of the user vehicle 10 and the door for the luggage space of the user vehicle 10 independently of each other.

The body ECU 304 is a computer that performs body control for the user vehicle 10. The body ECU 304 has a function of unlocking and locking the doors of the user vehicle 10 by controlling the door lock actuator 305 based on the unlocking command or locking command received from the collation ECU 303.

Next, the key unit 100 will be described. The key unit 100 is a device disposed at a predetermined position (e.g., in a glove box) in the interior of the user vehicle 10. The key unit 100 has a function of authenticating the delivery terminal 200 by establishing short-distance wireless communication with the delivery terminal 200, and a function of transmitting a locking-unlocking signal through the use of RF electric waves when this authentication is successful. The key unit 100 is configured to include an LF receiver 101, an RF transmitter 102, a short-distance communication unit 103, and a control unit 104.

The LF receiver 101 is a device that receives a polling signal transmitted from the locking-unlocking device 300 via LF electric waves. The LF receiver 101 includes an antenna (hereinafter referred to as an LF antenna) for receiving LF electric waves. The RF transmitter 102 is a device that transmits a locking-unlocking signal to the key unit 100 via RF electric waves.

The short-distance communication unit 103 is a device that communicates with the delivery terminal 200. The short-distance communication unit 103 establishes short-distance (that allows the interior of the user vehicle 10 and the outside of the user vehicle 10 to communicate with each other) communication through the use of a predetermined wireless communication standard. In the embodiment, the short-distance communication unit 103 establishes data communication according to a Bluetooth (registered trademark) Low Energy standard (hereinafter referred to as the BLE). The BLE is a low electric power communication standard based on Bluetooth, and has the feature that communication can be immediately started by detecting a partner without the necessity of pairing two devices. Although the BLE is exemplified in the embodiment, other wireless communication standards can also be utilized. For example, Near Field Communication (NFC), Ultra Wideband (UWB), Wi-Fi (registered trademark) and the like can also be utilized.

The control unit 104 is a computer that establishes short-distance wireless communication with the delivery terminal 200 via the short-distance communication unit 103, and that performs a process of authenticating the delivery terminal 200 and a process of transmitting a locking-unlocking signal based on a result of the authentication. The control unit 104 is, for example, a microcomputer.

Figure 3:
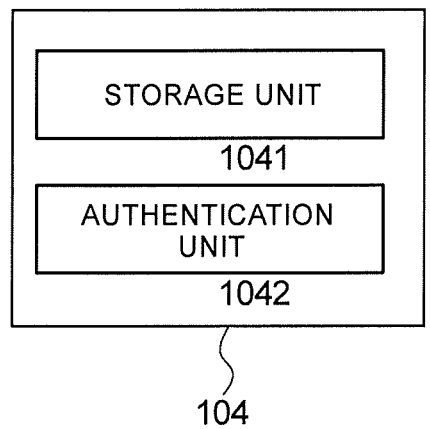
FIG. 3 is a view showing examples of functional modules included in a control unit of a key unit.

FIG. 3 shows functional modules included in the control unit 104. As shown in FIG. 3, the control unit 104 includes a storage unit 1041 and an authentication unit 1042. A control program for controlling the key unit 100 is stored in the storage unit 1041. The control unit 104 can realize various functions including the authentication unit 1042 by causing a CPU (not shown) to execute the control program stored in the storage unit 1041. For example, the control unit 104 realizes a function of receiving, via the LF receiver 101, a polling signal transmitted from the locking-unlocking device 300 as LF electric waves, a function of transmitting a locking-unlocking signal as RF electric waves to the locking-unlocking device 300 via the RF transmitter 102, a function of processing communication that is established with the delivery terminal 200 via the short-distance communication unit 103, a function of generating a locking-unlocking signal in the case where the authentication unit 1042 succeeds in authenticating the delivery terminal 200, and the like.

The authentication unit 1042 authenticates the delivery terminal 200 based on authentication information attached to a locking request or an unlocking request (hereinafter the locking request and the unlocking request may be referred to generically (collectively) as a locking-unlocking request) transmitted from the delivery terminal 200. The term "locking-unlocking request" signifies at least one of the locking request and the unlocking request. More specifically, the authentication unit 1042 compares the authentication information stored in the storage unit 1041 (the authentication information unique to the key unit 100) with the authentication information received from the delivery terminal 200, and determines that the authentication is successful when these pieces of authentication information coincide with each other. The authentication unit 1042 determines that the authentication is unsuccessful when the two pieces of authentication information do not coincide with each other.

When the authentication unit 1042 succeeds in authenticating the delivery terminal 200, a locking-unlocking signal generated in accordance with the request received from the delivery terminal 200 is transmitted to the locking-unlocking device 300 via the RF transmitter 102. The authentication unit 1042 may carry out authentication according to a method in which pieces of authentication information are simply compared with each other and it is confirmed whether they are identical to each other, or according to a method in which an asymmetric cipher is used. The authentication information stored in the storage unit 1041 of the key unit 100 will be referred to hereinafter as device authentication information, and the authentication information transmitted from the delivery terminal 200 will be referred to hereinafter as terminal authentication information (which may be regarded as "the predetermined authentication information" according to the disclosure), in accordance with the necessity for explanation.

The key unit 100 transmits an ID of the electronic key (hereinafter referred to as a key ID) together with a locking-unlocking signal, to the locking-unlocking device 300. The key ID may be stored in advance in the key unit 100 as a plain text, or may be stored after being encrypted as a cipher unique to the delivery terminal 200. In the case where the key ID is stored in an encrypted state, the original key ID may be obtained by decrypting the encrypted key ID through the use of the terminal authentication information transmitted from the delivery terminal 200.

Next, the delivery terminal 200 will be described. As described previously, the delivery terminal 200 is a terminal that is carried by the deliverer who carries out delivery work, or a terminal that is mounted in a delivery vehicle that is used by the deliverer when carrying out delivery work. For example, the delivery terminal 200 is a compact computer such as a smart phone, a cellular phone, a tablet terminal, a personal information terminal, or a wearable computer (a smart watch or the like). The delivery terminal 200 is configured to include a short-distance communication unit 201, a communication unit 202, a control unit 203, and an input-output unit 204.

The short-distance communication unit 201 is a device that communicates with the key unit 100 using the same communication standard as the communication standard used by the short-distance communication unit 103 of the key unit 100. The communication unit 202 is a communication device for connecting the delivery terminal 200 to a network. In the embodiment, the communication unit 202 can communication with other devices (e.g., the delivery management server device 400, the center server device 500, the user terminal 600, and the like) via the network, through the use of a mobile communication service such as 3rd Generation (3G), or Long Term Evolution (LTE).

The control unit 203 is a computer that controls the delivery terminal 200. The control unit 203 performs, for example, a process of acquiring the terminal authentication information, a process of generating a locking-unlocking request, a process of transmitting the locking-unlocking request together with the terminal authentication information to the key unit 100, and the like. The control unit 203 is, for example, a microcomputer, and realizes functions for performing the above-mentioned various processes by causing a CPU (not shown) to execute a program stored in a storage device (a ROM or the like).

The control unit 203 interacts with the deliverer via the input-output unit 204. The input-output unit 204 is a device that receives an input operation performed by the deliverer and that presents information to the deliverer. More specifically, the input-output unit 204 includes a touch panel and a control device for the touch panel, and a liquid-crystal display and a control device for the liquid-crystal display. In the embodiment, the touch panel and the liquid-crystal display are configured as a single touch panel display.

The control unit 203 displays an operational screen in the input-output unit 204, and generates a locking-unlocking request corresponding to the operation performed by the deliverer. For example, the control unit 203 outputs an icon for unlocking, an icon for locking, and the like to the touch panel display, and generates an unlocking request or a locking request based on the operation performed by the deliverer. The operation that is performed by the deliverer does not necessarily need to be performed via the touch panel display. For example, this operation may be performed via a hardware switch or the like.

The control unit 203 performs a process of acquiring terminal authentication information (predetermined authentication information) from the center server device 500. The terminal authentication information is not information (a key ID) for allowing the locking-unlocking device 300 to authenticate the key unit 100, and information (e.g., information associated with device authentication information unique to the key unit 100) for allowing the key unit 100 to authenticate the delivery terminal 200. More specifically, the control unit 203 transmits a first issuance request to the delivery management server device 400 via the communication unit 202. Terminal identification information for identifying the delivery terminal 200 is attached to "the first issuance request" mentioned herein. The delivery management server device 400 that has received the first issuance request determines, based on the terminal identification information attached to the first issuance request, whether the first issuance request has been transmitted from a rightful terminal. Then, if it is determined that the first issuance request has been transmitted from the rightful terminal, the delivery management server device 400 confirms whether the user of the user vehicle 10 is a rightful recipient of a delivery article (confirms the delivery suitability). If the user of the user vehicle 10 is thus confirmed to be the rightful recipient of the delivery, the delivery management server device 400 transmits a second issuance request to the center server device 500. User identification information for identifying the user as the recipient of the delivery, and predetermined proof information for proving that the user is the rightful recipient of the delivery are attached to "the second issuance request" mentioned herein. The center server device 500 that has received the second issuance request acquires terminal authentication information, and transmits the acquired terminal authentication information to the delivery terminal 200 on the condition that the predetermined proof information is attached to the second issuance request. That is, upon receiving the second issuance request, the center server device 500 first determines whether the predetermined proof information is attached to the second issuance request. When the predetermined proof information is not attached to the second issuance request, the center server device 500 transmits, to the delivery management server device 400, a signal indicating that the second issuance request cannot be accepted. On the other hand, when the predetermined proof information is attached to the second issuance request, the center server device 500 identifies the user vehicle 10 associated with the user identification information attached to the second issuance request, based on the user identification information. Subsequently, the center server device 500 acquires terminal authentication information associated with the device authentication information unique to the key unit 100 mounted in the identified user vehicle 10, and directly transmits the acquired terminal authentication information to the delivery terminal 200, or indirectly transmits the acquired terminal authentication information to the delivery terminal 200 via the delivery management server device 400. Thus, it becomes possible to perform unlocking and locking operations for the user vehicle 10, on the delivery terminal 200. In the case where the delivery terminal 200 does not have any terminal authentication information, the unlocking and locking operations for the user vehicle 10 cannot be performed on the delivery terminal 200.

The terminal authentication information acquired by the delivery terminal 200 in the embodiment is a one-time key that is invalidated in response to the locking of the doors resulting from the end of delivery work. For example, the terminal authentication information that is transmitted from the center server device 500 is stored into a storage unit (not shown) of the delivery terminal 200 at a timing when the delivery terminal 200 receives the terminal authentication information. After that, the terminal authentication information is deleted from the above-mentioned storage unit at a timing when the delivery terminal 200 receives a locking notification that is transmitted from the key unit 100 due to the locking operation for the doors resulting from the end of delivery work. The timing when the terminal authentication information stored in the storage unit of the delivery terminal 200 is deleted is not limited to the timing in the above-mentioned example, and may be a timing after the lapse of a predetermined effective period from the timing when the unlocking operation for the doors is performed as a result of the start of delivery work. The terminal authentication information does not necessarily need to be a one-time key as described above, and may be an invariable key. In addition, the device authentication information associated with the terminal authentication information is stored in advance into the key unit 100, regardless of whether the terminal authentication information is a one-time key or an invariable key.

Next, the delivery management server device 400 will be described. The delivery management server device 400 is a computer including a processor (not shown) such as a central processing unit (a CPU) or a digital signal processor (a DSP), a main storage unit (not shown) such as a random access memory (a RAM) or a read only memory (a ROM), and an auxiliary storage unit (not shown) such as an erasable programmable ROM (an EPROM), a hard disk drive (an HDD), or a removable medium. The removable medium is, for example, a universal serial bus (USB) memory or a disc recording medium such as a compact disc (a CD) or a digital versatile disc (a DVD). An operating system (an OS), various programs, various tables and the like are stored in the auxiliary storage unit. Functions for achieving a predetermined purpose can be realized when a program stored in the auxiliary storage unit is stored into an operation region of the main storage unit, and the processor executes the program and controls the components and the like through the execution of the program.

The delivery management server device 400 includes a communication unit 402. The communication unit 402 is a communication device for connecting the delivery management server device 400 to a network. For example, the communication unit 402 communicates with the center server device 500 via the network through the use of a communication network such as Local Area Network (LAN), Wide Area Network (WAN), or Wi-Fi, and communicates with the delivery terminal 200 via the network through the use of the mobile communication service as described above.

The delivery management server device 400 includes a delivery management database (DB) 403. The delivery management DB 403 is formed by storing delivery information in the above-mentioned auxiliary storage unit. In the delivery management DB 403, identification information on the user as the recipient of a delivery article and delivery information are linked with each other. The delivery management DB 403 is constructed by managing the data stored in the auxiliary storage unit with the use of a program of a database management system (a DBMS) that is executed by a processor. The delivery management DB 403 is, for example, a relational database.

An example configuration of the delivery information stored in the delivery management DB 403 will now be described based on FIG. 4. FIG. 4 is a view showing an example of the configuration of a table of delivery information. The delivery information table shown in FIG. 4 has fields representing user ID, delivery date and time, delivery place, delivery status, and delivery suitability confirmation information, respectively. User identification information for identifying the user is input to the user ID field. Information indicating a scheduled date and time when a delivery article is to be delivered is input to the delivery time-and-date field. As for the delivery time in particular, a specific time or a specific time zone in which delivery should be performed may be input to the delivery time-and-date field. Information indicating a delivery destination for the delivery is input to the delivery place field. For example, the term "vehicle" is input to the delivery place field in the case where the delivery destination for the delivery article is the interior of the user vehicle 10, and the term "domicile" is input to the delivery place field in the case where the delivery destination is a domicile such as the user's home. Information indicating whether the deliverer has completed delivery work for the delivery article is input to the delivery status field. For example, the word "completed" is input to the delivery status field in the case where delivery work for the delivery article has been completed, and the words "not completed" are input to the delivery status field in the case where delivery work for the delivery article has not been completed. Information indicating whether the delivery article requires confirmation of the above-mentioned delivery suitability is input to the delivery suitability confirmation information field. For example, the word "required" is input to the delivery suitability confirmation information field in the case where the delivery suitability needs to be confirmed, and the words "not required" are input to the delivery suitability confirmation information field in the case where the delivery suitability does not need to be confirmed. The delivery information table may have a delivery information field for inputting information on the size of a delivery article, the number of delivery articles and the like, in addition to the above-mentioned various information fields.

A control unit 401 is formed in the delivery management server device 400. The control unit 401 is a functional unit that is realized through the execution of the program by the above-mentioned processor. The control unit 401 performs management control such as the registration of delivery information in the delivery management DB 403, and the update of delivery information. For example, when the user or the sender makes a request for delivery of a delivery article, the delivery date and time, the delivery place and the like are linked with the user identification information on the user as the recipient of the delivery article to generate delivery information corresponding to the user, and the generated delivery information is registered in the delivery management DB 403. When the user or the sender makes a request for changing the delivery date and time, delivery place or the like after the delivery information is registered in the delivery management DB 403, the control unit 401 updates the contents registered in the delivery management DB 403 in accordance with the request for the change. The control unit 401 also updates information on the delivery status by communicating with the delivery terminal 200 via a communication unit 502. Furthermore, when the delivery destination for the delivery article is the interior of the user vehicle 10 and the delivery article requires confirmation of the above-mentioned delivery suitability, the control unit 401 confirms the delivery suitability by communicating with the user terminal 600 via the communication unit 402. More specifically, the control unit 401 first transmits a request for transmission of confirmation information necessary for confirming the delivery suitability, from the communication unit 402 to the user terminal 600. The confirmation information mentioned herein includes information necessary for confirming that the user has agreed to receiving the delivery article (e.g., information on the user's digital signature, digital seal or the like), information necessary for confirming that the user is the true recipient of the delivery article (i.e., information necessary for identification) (e.g., the user's digital signature, digital seal, or biological information), and information necessary for settling the payment on delivery for the delivery article (e.g., information on the password necessary for debiting the collectible fee from the user's saving account or the like, or the number of the user's credit card). Then, when the communication unit 402 receives the confirmation information that is transmitted from the user terminal 600 in response to the transmission request, the control unit 401 confirms the delivery suitability based on the confirmation information. In the case where the delivery article requires the user's agreement to receiving it, it is determined that the user has been confirmed to be the rightful recipient of the delivery article when the communication unit 402 receives the information on the user's digital signature, digital seal or the like as the above-mentioned confirmation information. In the case where the delivery article requires confirmation of the recipient's identity, it is determined that the user has been confirmed to be the rightful recipient of the delivery article when the communication unit 402 succeeds in collating the user's digital signature, digital seal or biological information received as the confirmation information with the information on the digital signature, digital seal or biological information of a person registered in advance as the recipient of the delivery article. Furthermore, in the case where the delivery article requires the settlement of the payment on delivery, it is determined that the user has been confirmed to be the rightful recipient of the delivery article when the communication unit 402 succeeds in settling the payment on delivery according to the information on the password, the number of the credit card or the like received as the confirmation information. When the user of the user vehicle 10 is confirmed to be the rightful recipient of the delivery article in confirming the delivery suitability as described above, the control unit 401 generates predetermined proof information as information for proving that the user is the rightful recipient.

The delivery terminal 200 may also make a request for transmission of the above-mentioned confirmation information. In this case, the confirmation information that is transmitted from the user terminal 600 in response to the request for transmission of the confirmation information may be directly transmitted from the user terminal 600 to the delivery management server device 400, or may be indirectly transmitted from the user terminal 600 to the delivery management server device 400 via the delivery terminal 200. In the configuration in which the above-mentioned confirmation information is indirectly transmitted from the user terminal 600 to the delivery management server device 400 via the delivery terminal 200, the delivery terminal 200 may transmit the confirmation information together with the above-mentioned first issuance request to the delivery management server device 400 after receiving the confirmation information from the user terminal 600. In the case where a dedicated server device other than the delivery management server device 400 and the center server device 500 confirms the delivery suitability as described above, the confirmation information transmitted from the user terminal 600 to the delivery terminal 200 may be transmitted to the above-mentioned dedicated server device from the delivery terminal 200. Then, when the above-mentioned dedicated server device confirms that the user of the user vehicle 10 is the rightful recipient of the delivery article, the predetermined proof information for proving that the user is the rightful recipient may be directly transmitted from the above-mentioned dedicated server device to the delivery management server device 400, or may be indirectly transmitted to the delivery management server device 400 via the delivery terminal 200.

In the case where the user vehicle 10 is designated as the delivery destination for a delivery article, vehicle management information that links the user and the user vehicle 10 with each other is also stored in the delivery management DB 403. An example configuration of the vehicle management information stored in the delivery management DB 403 will now be described based on FIG. 5. FIG. 5 is a view showing an example of the configuration of a table of the vehicle management information. The vehicle management information table shown in FIG. 5 has fields representing user ID, vehicle specification information, and vehicle position, respectively. The same user identification information as in the user ID field of the delivery management DB 403 is registered in the user ID field. Information that allows the deliverer to visually identify the user vehicle 10 as the delivery destination (e.g., a vehicle type, a vehicle body color, and a license plate) is registered in the vehicle specification information field. Information indicating a position where the user vehicle 10 is parked is registered in the vehicle position field. The information on the position of the user vehicle 10 is registered based on an application from the user. In the case where the user vehicle 10 is provided with a communication device that can communicate with the center server device 500, the control unit 401 may acquire the information on the position of the user vehicle 10, which is obtained by the center server device 500 via the communication device, from the center server device 500 via the communication unit 402, and may register the information into the vehicle position field. The number of the user IDs linked with a single piece of vehicle specification information in the vehicle management information is not limited to one. For example, in the case where family members or the like share a single vehicle, a plurality of user IDs may be linked with a single piece of vehicle specification information.

Then, the control unit 401 transmits, to the delivery terminal 200, a commission to carry out delivery work, such that the deliverer can carry out delivery work, based on the delivery information and vehicle management information linked with the user. The "commission to carry out delivery work" mentioned herein includes, for example, the delivery date and time, the delivery place, the vehicle specification information, the vehicle position information, the information on a delivery article, and the like. This commission to carry out delivery work may be transmitted to the delivery terminal 200 a plurality of times instead of being transmitted once. For example, on the date before a scheduled delivery date, commissions relating to the delivery work on the following date may be comprehensively transmitted to the delivery terminal 200. The above-mentioned commissions may be transmitted again to the delivery terminal 200 on the scheduled delivery date. If the delivery information or the vehicle management information is changed (updated), commissions reflecting the changed contents are transmitted when the commissions are transmitted again to the delivery terminal 200.

Any one of the functional components of the delivery management server device 400 or one or some of its processes may be realized or performed by another computer that is connected to the delivery management server device 400 via the network. The series of processes performed by the delivery management server device 400 can be performed by hardware and/or software.

Next, the center server device 500 will be described. The center server device 500 is also configured as a general computer, has the same basic hardware configuration as that of the delivery management server device 400, and includes a processor (not shown), a main storage unit (not shown), and an auxiliary storage unit (not shown). Accordingly, functions for achieving a predetermined purpose can be realized when a program stored in the auxiliary storage unit is loaded into an operation region of the main storage unit, and the processor executes the program and controls the components and the like through the execution of the program. The center server device 500 also includes the communication unit 502. The communication unit 502 is functionally the same as or similar to the communication unit 402 included in the delivery management server device 400, and establishes communication between the center server device 500 and other devices (e.g., the delivery management server device 400 and the like).

The auxiliary storage unit of the center server device 500 includes a user information DB 503 and an authentication information DB 504, which store various pieces of information. Each of these databases (DBs) is constructed by managing data stored in the auxiliary storage unit with the use of a program of a database management system that is executed by a processor. The user information DB 503 and the authentication information DB 504 are, for example, relational databases.

The user information DB 503 stores user identification information for identifying the user and user vehicle identification information for identifying the user vehicle 10 possessed or rented by the user, in a state where these pieces of information are linked with each other. In this case, the number of pieces of user identification information lined with a single piece of user vehicle identification information is not limited one. In the case where family members or the like share a single vehicle as described previously, a plurality of pieces of user identification information may be linked with a single piece of user vehicle identification information.

The authentication information DB 504 stores user vehicle identification information for identifying the user vehicle 10, device authentication information unique to the key unit 100 that is mounted in the user vehicle 10, terminal authentication information associated with the device authentication information, in a state where these pieces of information are linked with one another. The authentication information DB 504 may also store information on a validity period of each piece of terminal authentication information, the expiration or non-expiration of each piece of terminal authentication information, and the like. When the terminal authentication information is transmitted to the delivery terminal 200, the information on the validity period of the terminal authentication information may be transmitted to the delivery terminal 200, together with the terminal authentication information. In this case, as described previously, the delivery terminal 200 may invalidate the terminal authentication information stored in the storage unit of the delivery terminal 200 by deleting the terminal authentication information upon the lapse of the validity period from a timing when the unlocking operation for the doors is performed in response to the start of delivery work.

A control unit 501 is formed in the center server device 500. The control unit 501 is a functional unit that is realized through the execution of the program by the above-mentioned processor. The control unit 501 performs the control relating to the issuance of authentication information for the delivery terminal 200 and the like. More specifically, when the communication unit 502 receives the second issuance request that is transmitted from the delivery management server device 400, the control unit 501 first determines whether predetermined proof information is attached to the second issuance request. If the predetermined proof information is not attached to the second issuance request, the control unit 501 transmits a signal indicating that the second issuance request cannot be accepted, from the communication unit 502 to the delivery management server device 400. On the other hand, if the predetermined proof information is attached to the second issuance request, the control unit 501 derives user vehicle identification information corresponding to the user identification information attached to the second issuance request, by accessing the user information DB 503. Subsequently, the control unit 501 derives terminal authentication information corresponding to the user vehicle identification information derived from the user information DB 503, by accessing the authentication information DB 504. Then, the control unit 501 transmits the terminal authentication information derived from the authentication information DB 504 (and information on the validity period) to the delivery terminal 200 via the communication unit 502. In this case, the above-mentioned terminal authentication information may be directly transmitted to the delivery terminal 200, or may be indirectly transmitted to the delivery terminal 200 via the delivery management server device 400.

Any one of the functional components of the center server device 500 as described above or one or some of its processes may be realized or performed by another computer that is connected to the center server device 500 via the network. The series of processes performed by the center server device 500 can be performed by hardware and/or software.

Next, the user terminal 600 will be described. The user terminal 600 may be a compact computer such as a smart phone, a cellular phone, a tablet terminal, a personal information terminal, or a wearable computer (a smart watch or the like) as is the case with the delivery terminal 200, or may be a personal computer. This user terminal 600 is configured to include a communication unit 601, a control unit 602, and an input-output unit 603.

The communication unit 601 is a communication device for connecting the user terminal 600 to the network as is the case with the communication unit 202 of the delivery terminal 200, and can communicate with other devices (e.g., the delivery terminal 200, the delivery management server device 400, the center server device 500, and the like) via the network, through the use of a mobile communication service such as 3G or LTE.

The control unit 602 is a computer that controls the user terminal 600. The control unit 602 performs, for example, a process of urging the user to input confirmation information, a process of transmitting the confirmation information input by the user to the delivery management server device 400, and the like, in addition to a process of transmitting a request for delivery of a delivery article to the delivery management server device 400. The control unit 602 is, for example, a microcomputer. Functions for performing the above-mentioned various processes are realized by causing a CPU (not shown) to execute a program stored in a storage device (a ROM or the like) (not shown).

The control unit 602 interacts with the user via the input-output unit 603. The input-output unit 603 is a device that accepts an input operation performed by the user and that presents information to the user. The input-output unit 603 includes, for example, a touch panel and a control device for the touch panel, and a liquid-crystal display and a control device for the liquid-crystal display. When the communication unit 601 receives the above-mentioned request for transmission of confirmation information that is transmitted from the delivery management server device 400, the control unit 602 urges the user to input the confirmation information by causing the input-output unit 603 to display an operational screen for inputting the confirmation information. For example, the control unit 602 outputs a screen for inputting a digital signature, a screen for inputting a digital seal, and a screen for inputting a password, a credit card number or the like to a touch panel display. When the user inputs the confirmation information on these screens, the control unit 602 performs a process of transmitting the input confirmation information to the delivery management server device 400.

In FIG. 2, the user terminal 600 does not explicitly include a configuration equivalent to the short-distance communication unit 201 of the delivery terminal 200. However, the user terminal 600 may include the configuration equivalent to the short-distance communication unit 201 of the delivery terminal 200, and may be configured to cause the locking-unlocking device 300 of the user vehicle 10 to operate by acquiring terminal authentication information according to the same procedure as in the delivery terminal 200 and transmitting the terminal authentication information to the key unit 100 through short-distance wireless communication.

Figure 6:
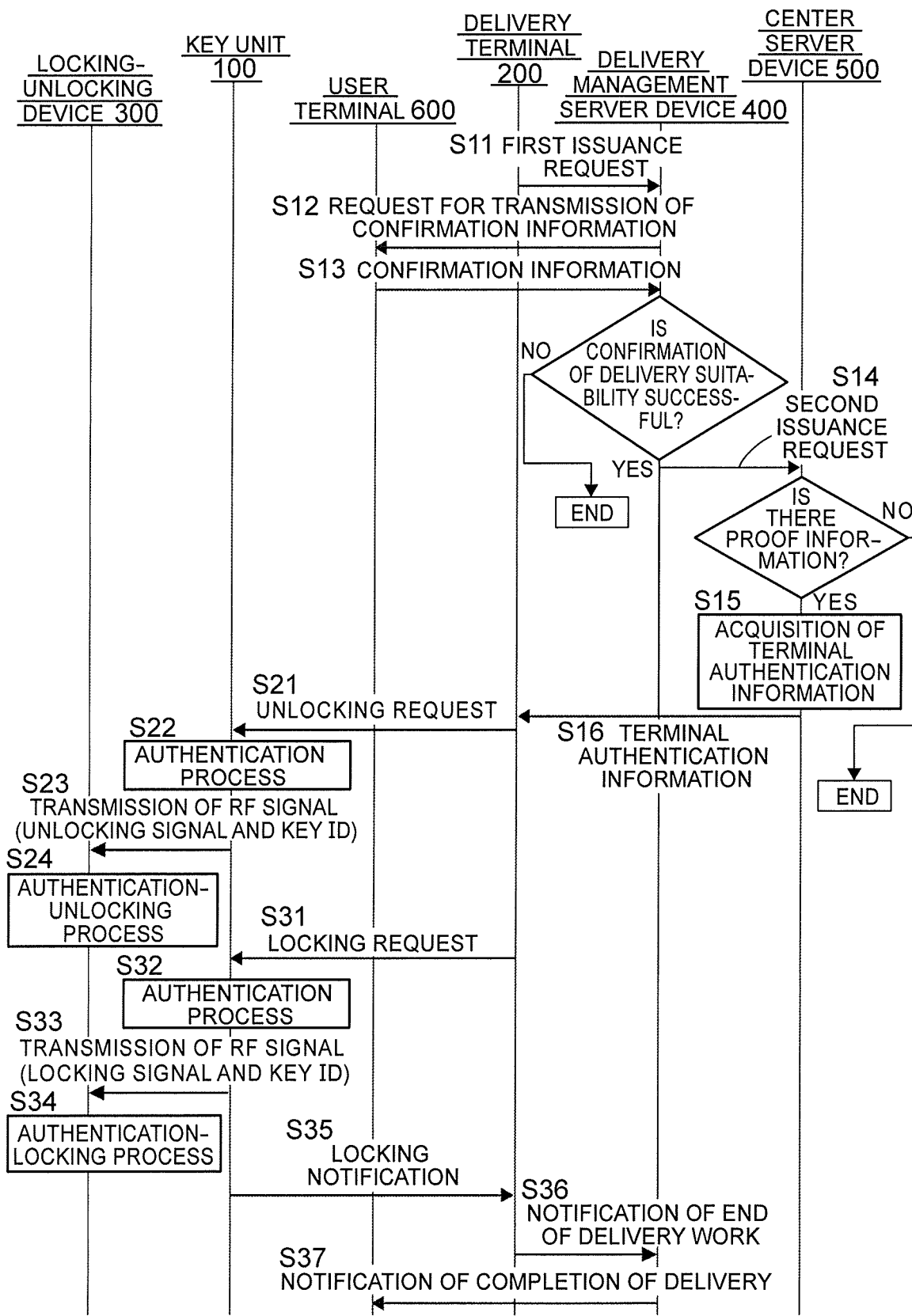
FIG. 6 is a flowchart showing the flow of data and processes among components in the trunk share system according to the embodiment.

The operation of the trunk share system in carrying out delivery work for a delivery article that requires confirmation of delivery suitability will now be described based on FIG. 6. FIG. 6 is a flowchart illustrating the flow of data transmitted and received among the components and processes that are performed by the components. In the flow shown in FIG. 6, it is assumed that a person, who has received a commission to deliver the delivery article, has notified in advance the contents of the commission to the deliverer who carries out delivery work. The person has received the commission from the user of the user vehicle 10 as a delivery destination for the delivery article, or the sender of the delivery article. That is, the above-mentioned "commission to carry out delivery work (the delivery date and time, the delivery place, the vehicle specification information, the vehicle position information, the delivery information and the like)" has been transmitted from the delivery management server device 400 to the delivery terminal 200 in advance.

First, when the deliverer who has received the commission to carry out delivery work performs an operation for requesting the issuance of terminal authentication information via the input-output unit 204 of the delivery terminal 200, the delivery terminal 200 transmits a first issuance request together with identification information on the delivery terminal 200 to the delivery management server device 400 in step S11.

Upon receiving the terminal identification information and the first issuance request which have been transmitted from the delivery terminal 200, the delivery management server device 400 determines, based on the terminal identification information, whether the first issuance request has been transmitted from a rightful terminal. If it is determined that the first issuance request has been transmitted from the rightful terminal, the delivery management server device 400 transmits a request for transmission of confirmation information that is needed to confirm the delivery suitability, to the user terminal 600 in step S12. "The request unit" according to the disclosure is realized when the delivery management server device 400 performs the processing of step S12.

Upon receiving the request for transmission of confirmation information that has been transmitted from the delivery management server device 400, the user terminal 600 performs the process of urging the user to input the confirmation information. When the user inputs the confirmation information in response to this urging, the user terminal 600 transmits the input confirmation information to the delivery management server device 400 in step S13.

Upon receiving the confirmation information transmitted from the user terminal 600, the delivery management server device 400 confirms the delivery suitability based on the confirmation information. "The confirmation unit" according to the disclosure is realized when the delivery management server device 400 confirms the delivery suitability according to this procedure. If the user is not confirmed to be the rightful recipient of the delivery article (i.e., if the confirmation of the delivery suitability is unsuccessful) in confirming the above-mentioned delivery suitability, the delivery work for the delivery article is canceled (or suspended). In this case, the delivery management server device 400 may, for example, notify the user terminal 600 that the delivery article cannot be delivered, and notify the delivery terminal 200 that delivery work for the delivery article is canceled (or suspended). On the other hand, if the user is confirmed to be the rightful recipient of the delivery article in confirming the delivery suitability (i.e., if the confirmation of the delivery suitability is successful), the delivery management server device 400 generates predetermined proof information to acquire the proof information. Thus, "the proof information acquisition unit" according to the disclosure is realized. Then, the delivery management server device 400 transmits a second issuance request together with the identification information on the user as the recipient of the delivery article and the above-mentioned predetermined proof information, to the center server device 500 in step S14.

Upon receiving the second issuance request transmitted from the delivery management server device 400, the center server device 500 determines whether the predetermined proof information is attached to the second issuance request. In this case, if the predetermined proof information is not attached to the second issuance request, the delivery management server device 400 has not acquired the predetermined proof information, and thus, the center server device 500 does not perform the processes relating to the issuance of terminal authentication information (the process of acquiring terminal authentication information, the process of transmitting terminal authentication information to the delivery terminal 200, and the like). In this case, the center server device 500 transmits, to the delivery management server device 400, a signal indicating that the second issuance request cannot be accepted. On the other hand, if the predetermined proof information is attached to the second issuance request, the delivery management server device 400 has acquired the predetermined proof information, and thus, the center server device 500 derives user vehicle identification information corresponding to the user identification information received together with the second issuance request, based on the user identification information. "The vehicle information acquisition unit" according to the disclosure is realized when the center server device 500 derives the user vehicle identification information. Subsequently, the center server device 500 acquires terminal authentication information associated with the device authentication information unique to the key unit 100 that is mounted in the user vehicle 10, based on the user vehicle identification information (step S15). "The authentication information acquisition unit" according to the disclosure is realized when the center server device 500 performs the processing of step S15. Then, the center server device 500 transmits the terminal authentication information acquired in step S15 to the delivery terminal 200 (step S16). "The authentication information issuance unit" according to the disclosure is realized when the center server device 500 performs the processing of this step S16. The terminal authentication information acquired by the center server device 500 may be transmitted from the center server device 500 to the delivery terminal 200 via the delivery management server device 400. Upon receiving the terminal authentication information that is thus transmitted from the center server device 500, the delivery terminal 200 can perform the locking-unlocking operation for the user vehicle 10 (i.e., the operations for unlocking and locking the user vehicle 10).

Subsequently, in steps S21 to S24, the process of unlocking the doors of the user vehicle 10 is performed through the use of the delivery terminal 200. When the processing of steps S21 to S24 is performed, the deliverer who has referred to vehicle specification information, vehicle position information and the like is assumed to have moved the delivery terminal 200 to a position where short-distance wireless communication between the key unit 100 of the user vehicle 10 and the delivery terminal 200 is established.

When the deliverer performs the unlocking operation for the user vehicle 10 (i.e., the operation for unlocking the user vehicle 10) via the input-output unit 204 of the delivery terminal 200, the delivery terminal 200 transmits an unlocking request together with the terminal authentication information to the key unit 100 in step S21. Then, upon receiving the terminal authentication information and unlocking request that are transmitted from the delivery terminal 200, the key unit 100 performs an authentication process by comparing the terminal authentication information that is transmitted from the delivery terminal 200 with the device authentication information stored in advance, in step S22. Upon succeeding in authentication process with the use of the terminal authentication information and the device authentication information, the key unit 100 transmits an unlocking signal and a key ID to the locking-unlocking device 300 in step S23. Upon receiving the unlocking signal and key ID transmitted from the key unit 100, the locking-unlocking device 300 performs the authentication process based on the received key ID, in step S24. As a result, when the authentication is successful, the doors of the user vehicle 10 are unlocked. In this case, for example, answer-back may be performed. When the doors of the user vehicle 10 are thus unlocked, the deliverer can open at least one of the doors and put the delivery article into the interior of the vehicle.

In steps S31 to S37, a process for locking the user vehicle 10 with the use of the delivery terminal 200 is performed. When the deliverer closes the at least one of the doors and performs the operation for locking the user vehicle 10 via the input-output unit 204 of the delivery terminal 200 after the delivery article has been put into the interior of the user vehicle 10, the delivery terminal 200 transmits a locking request together with the terminal authentication information to the key unit 100 in step S31. Upon receiving the terminal authentication information and locking request that are transmitted from the delivery terminal 200, the key unit 100 performs the authentication process by comparing the terminal authentication information that is transmitted from the delivery terminal 200 with the device authentication information stored in advance, in step S32. Upon succeeding in the authentication process with the use of the terminal authentication information and the device authentication information, the key unit 100 transmits a locking signal and a key ID to the locking-unlocking device 300 in step S33. Upon receiving the locking signal and key ID transmitted from the key unit 100, the locking-unlocking device 300 performs the authentication process based on the received key ID, in step S34. That is, the locking-unlocking device 300 determines whether the key ID received from the key unit 100 coincides with the key ID stored in advance in the locking-unlocking device 300. As a result, when the authentication is successful, the doors of the user vehicle 10 are locked. After transmitting a locking signal to the locking-unlocking device 300, the key unit 100 transmits a notification of the completion of locking (i.e., a locking notification indicating that locking is completed) to the delivery terminal 200 (step S35). Thus, the notification of the completion of locking is output onto the touch panel screen of the delivery terminal 200. Upon receiving the above-mentioned locking notification, the delivery terminal 200 generates a notification of the end of delivery work (i.e., a notification indicating that delivery work is ended), and transmits the generated notification to the delivery management server device 400 in step S36. Upon receiving the notification of the end of delivery work that is transmitted from the delivery terminal 200, the delivery management server device 400 generates a notification of the completion of delivery work for the delivery article (i.e., a notification indicating that delivery work for the delivery article is completed), and transmits the generated notification to the user terminal 600, in step S37. This notification may be transmitted from the delivery terminal 200 to the user terminal 600. Upon finishing transmitting the notification of the end of delivery work to the delivery management server device 400, the delivery terminal 200 invalidates the terminal authentication information acquired from the center server device 500 in the above-mentioned step S16, in step S37. That is, the terminal authentication information that is stored in the storage unit of the delivery terminal 200 is deleted from the storage unit. In the case where a validity period is set for the terminal authentication information that is transmitted from the center server device 500, the delivery terminal 200 may invalidate the terminal authentication information acquired from the center server device 500 in the above-mentioned step S16, upon the lapse of the validity period from a timing when the processing of the above-mentioned step S21 (the process of transmitting an unlocking request to the key unit 100) is performed.

According to the embodiment described above, when a request for delivery of the delivery article that requires confirmation of the delivery suitability is made, the predetermined authentication information (the terminal authentication information) is not issued to the delivery terminal 200 unless the delivery management server device 400 acquires the predetermined proof information. That is, the delivery terminal 200 cannot perform the locking-unlocking operation for the user vehicle 10 unless the user of the user vehicle 10 is confirmed to be the rightful recipient of this delivery article. Therefore, inconveniences, such as the delivering of the delivery article against the user's will, the delivering of the delivery article to someone other than the rightful recipient, and the delivering of the delivery article with the payment on delivery unsettled, are unlikely to be caused. As a result, it is possible to appropriately carry out delivery work for the delivery article that requires confirmation of the delivery suitability.

Figure 7:
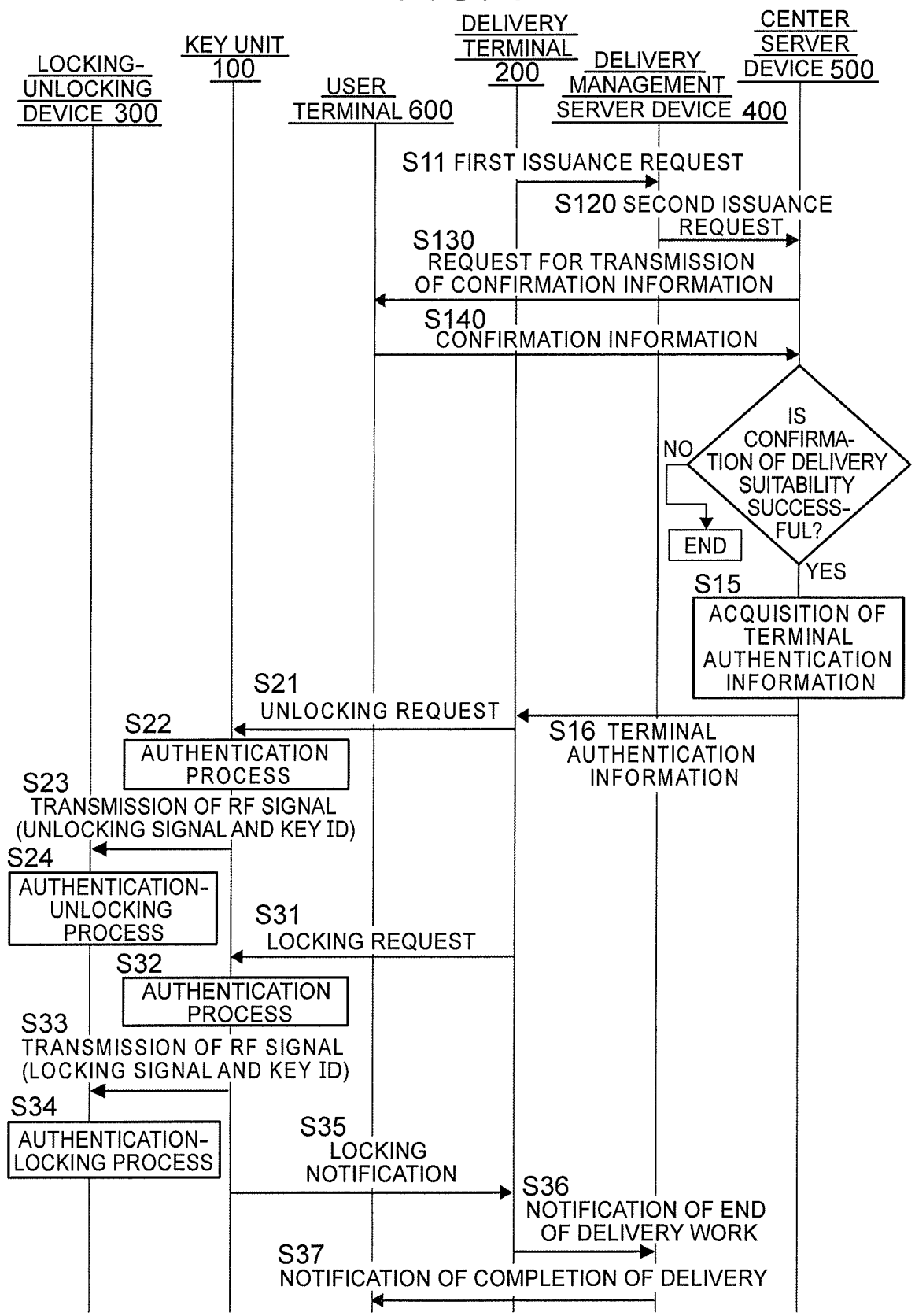
FIG. 7 is a flowchart showing the flow of data and processes among components in a trunk share system according to a first modification example.

A first modification example will be described. In the above-mentioned embodiment, the delivery management server device 400 performs the process of confirming the delivery suitability. However, the center server device 500 may perform the process. That is, the center server device 500 may confirm the delivery suitability by directly communicating with the user terminal 600 when the delivery management server device 400 makes a request for issuance of terminal authentication information. The operation of a trunk share system in the present modification example will now be described based on FIG. 7. FIG. 7 is a flowchart illustrating the flow of data transmitted and received among the components in the present modification example and the processes that are performed by the components. In the flow of FIG. 7, processing steps that are identical or similar to those in the above-mentioned flow of FIG. 6 are denoted by the same reference numerals respectively, and the description of those processing steps will be omitted.

Upon receiving terminal identification information and a first issuance request that are transmitted from the delivery terminal 200, the delivery management server device 400 determines, based on the terminal identification information transmitted from the delivery terminal 200, whether the first issuance request has been transmitted from a rightful terminal. If it is determined that the first issuance request has been transmitted from the rightful terminal, the delivery management server device 400 transmits a second issuance request to the center server device 500 in step S120. In addition to the identification information on the user as the recipient of the delivery article, information indicating whether the delivery suitability needs to be confirmed is attached to "the second issuance request" in the present modification example.

Upon receiving the second issuance request that is transmitted from the delivery management server device 400, the center server device 500 transmits, to the user terminal 600, a request for transmission of confirmation information that is needed to confirm the delivery suitability, in step S130. In the present modification example, "the request unit" according to the disclosure is realized when the center server device 500 performs the processing of step S130.

Upon receiving the request for transmission of confirmation information transmitted from the center server device 500, the user terminal 600 performs the process of urging the user to input the conformation information as is the case with the above-mentioned embodiment. When the user inputs the confirmation information in such a manner as to respond to this urging, the user terminal 600 transmits the input confirmation information to the center server device 500 in step S140.

Upon receiving the confirmation information transmitted from the user terminal 600, the center server device 500 confirms the delivery suitability based on the confirmation information. In the present modification example, "the confirmation unit" according to the disclosure is realized when the center server device 500 confirms the delivery suitability according to this procedure. If the user is not confirmed to be the rightful recipient of the delivery article (i.e., if confirmation of the delivery suitability is unsuccessful) in confirming the delivery suitability, the process relating to the issuance of terminal authentication information is canceled (or suspended). In this case, the center server device 500 may transmit information indicating that the delivery suitability cannot be confirmed, at least to the delivery management server device 400 (i.e., to the delivery management server device 400, or to the user terminal 600 and the delivery management server device 400). Then, the delivery management server device 400 may notify the user terminal 600 that the delivery article cannot be delivered, and may notify the delivery terminal 200 that delivery work for the delivery article is canceled (or suspended). On the other hand, if the user is confirmed to be the rightful recipient of the delivery article (i.e., if confirmation of the delivery suitability is successful) in confirming the delivery suitability, the center server device 500 performs processes relating to the issuance of terminal authentication information (the process of acquiring terminal authentication information and the process of transmitting the terminal authentication information to the delivery terminal 200). If the user is confirmed to be the rightful recipient of the delivery article in confirming the delivery suitability, the center server device 500 may generate predetermined proof information. However, the predetermined proof information may be regarded as having been acquired, when the delivery suitability is confirmed (i.e., when the user is confirmed to be the rightful recipient of the delivery article).

According to the modification example described above, when a request for delivery of a delivery article that requires confirmation of the delivery suitability is made, the predetermined authentication information (the terminal authentication information) is not issued to the delivery terminal 200 unless the center server device 500 confirms the delivery suitability (unless a condition corresponding to the acquisition of the predetermined proof information is fulfilled). Thus, the delivery terminal 200 cannot perform the locking-unlocking operation for the user vehicle 10 unless the user of the user vehicle 10 is confirmed to be the rightful recipient of the delivery article. As a result, it is possible to appropriately carry out delivery work for the delivery article that requires confirmation of the delivery suitability.

A second modification example will be described. In each of the above-mentioned embodiment and the first modification example, the user terminal 600 is requested to transmit confirmation information on the condition that the first issuance request from the delivery terminal 200 (or the second issuance request from the delivery management server device 400) is made. In the present modification example, however, the user terminal 600 may be requested to transmit confirmation information upon fulfillment of a condition that the distance between the user vehicle 10 as the delivery destination and the delivery terminal 200 is equal to or shorter than a predetermined distance, in addition to the above-mentioned condition.

In the case where the interior of the user vehicle is utilized as a place where a delivery article is delivered and received, if the user terminal is requested to transmit confirmation information before the deliverer reaches a position close to the vehicle as the delivery destination (a position where the operation of putting the delivery article into the interior of the user vehicle can be immediately performed), a long time may elapse after the user performs the act of transmitting the confirmation information through the user terminal, until the deliverer delivers the delivery article into the interior of the user vehicle. Thus, when the user enters the interior of the user vehicle to pick up the delivery article, there is a possibility that the delivery article has not been delivered into the interior of the user vehicle.

Thus, in the present modification example, the user terminal 600 may be requested to transmit confirmation information on the condition that the distance between the key unit 100 of the user vehicle 10 as the delivery destination and the delivery terminal 200 is equal to or shorter than the longest distance that allows short-distance wireless communication to be established between the key unit 100 and the delivery terminal 200, in other words, on the condition that the delivery terminal 200 is located at a position where short-distance wireless communication is established between the key unit 100 and the delivery terminal 200.

The operation of a trunk share system in the present modification example will now be described based on FIG. 8. FIG. 8 is a flowchart illustrating the flow of data transmitted and received among the components in the present modification example and the processes that are performed by the components. In the flow of FIG. 8, processing steps that are identical or similar to those in the above-mentioned flow of FIG. 6 are denoted by the same reference numerals respectively, and the description of those processing steps will be omitted.

When the deliverer who has received a commission to carry out delivery work performs an operation for requesting the issuance of terminal authentication information via the input-output unit 204 of the delivery terminal 200, the delivery terminal 200 transmits position information on the delivery terminal 200 together with identification information on the delivery terminal 200 and a first issuance request, to the delivery management server device 400 in step S150. The position information on the delivery terminal 200 can be acquired by, for example, a global positioning system (GPS), a system utilizing a cell ID, or a system utilizing Wi-Fi.

Upon receiving the terminal identification information, terminal position information, and first issuance request that are transmitted from the delivery terminal 200, the delivery management server device 400 determines, based on the terminal identification information that is transmitted from the delivery terminal 200, whether the first issuance request has been transmitted from a rightful terminal. If it is determined that the first issuance request has been transmitted from the rightful terminal, the delivery management server device 400 confirms (determines) whether the distance between the delivery terminal 200 and the user vehicle 10 is equal to or shorter than a predetermined distance (the longest distance that allows short-distance wireless communication to be established between the key unit 100 and the delivery terminal 200) (i.e., the delivery management server device 400 performs position confirmation) by comparing the terminal position information that is transmitted from the delivery terminal 200 with the position information on the user vehicle 10. The position information on the user vehicle 10 may be derived from the vehicle management information table in the delivery management DB 403. In a configuration in which the user vehicle 10 is provided with a communication device that can communicate with the center server device 500, the delivery management server device 400 may acquire, from the center server device 500, the vehicle position information acquired by the center server device 500 via the communication device. Then, if it is determined that the distance between the delivery terminal 200 and the user vehicle 10 is longer than the predetermined distance (i.e., if the position confirmation is unsuccessful), the delivery management server device 400 does not perform the process relating to the acquisition of confirmation information (a request for transmission of confirmation information to the user terminal 600) or the process relating to the acquisition of terminal authentication information (a second issuance request to the center server device 500). In this case, the delivery management server device 400 may notify the delivery terminal 200 that the first issuance request cannot be accepted. On the other hand, if it is determined that the distance between the delivery terminal 200 and the user vehicle 10 is equal to or shorter than the predetermined distance (i.e., if the position confirmation is successful), the delivery management server device 400 performs the process relating to the acquisition of confirmation information (a request for transmission of confirmation information to the user terminal 600) or the process relating to the acquisition of terminal authentication information (a second issuance request to the center server device 500).

According to the modification example described above, the request for transmission of confirmation information is made to the user terminal 600 on the condition that the delivery terminal 200 is located at a position where short-distance wireless communication is established between the key unit 100 of the user vehicle 10 and the delivery terminal 200. Therefore, it is possible to reduce the possibility that an excessively long time may elapse after the user transmits the confirmation information through the user terminal 600 until the deliverer delivers the delivery article into the interior of the user vehicle 10. Therefore, it is possible to improve user-friendliness.

A modification 1 of the embodiment will be described. In the above-mentioned embodiment, the on-board unit includes the key unit and the locking-unlocking device. However, the on-board unit may not include the key unit. More specifically, in the above-mentioned embodiment, the two-stage authentication process is performed, that is, the authentication process for terminal authentication information is performed by the key unit and the authentication process for the key ID is performed by the locking-unlocking device. However, only authentication of the key ID by the locking-unlocking device may be performed. In this case, the locking-unlocking device may have a function of directly communicating with the delivery terminal (e.g., the locking-unlocking device may have a short-distance communication unit). In this case, when the deliverer carries out delivery work, the delivery terminal may acquire the key ID corresponding to the user vehicle from the delivery management server device or the center server device, and a locking-unlocking signal including the key ID may be transmitted from the delivery terminal to the locking-unlocking device of the on-board unit, and thus, the authentication process for the key ID in the locking-unlocking device may be performed. In this case, the key ID that is acquired from the delivery management server device or the center server device by the delivery terminal may be regarded as "the predetermined authentication information" according to the disclosure.

A modification 2 of the embodiment will be described. In each of the above-mentioned embodiment, the modified examples, and the modification, the terminal authentication information associated with the invariable device authentication information unique to the key unit or the key ID corresponding to the user vehicle is used as "the predetermined authentication information" according to the disclosure, but the disclosure is not limited to the configuration. For example, in the case where the user vehicle is provided with a device that can communicate with the center server device, the center server device may generate new terminal authentication information each time the center server device receives a request for issuance of terminal authentication information from the delivery management server device, may transmit the new terminal authentication information thus generated to the delivery terminal, and may register the device authentication information corresponding to the new terminal authentication information thus generated, into the key unit via the communication device of the user vehicle. In this case, the delivery terminal may transmit, to the key unit, the new terminal authentication information received from the center server device. Then, the key unit may authenticate the delivery terminal by comparing the new terminal authentication information received from the delivery terminal with the new device authentication information registered by the center server device. According to this method, the predetermined authentication information can be changed each time the delivery work is carried out. Therefore, the security in utilizing a trunk share service can be enhanced.

As a method of generating the new terminal authentication information as described above, it is also possible to use a method of generating new terminal authentication information according to an algorithm using the key ID corresponding to the user vehicle and time information. In this case, the center server device may transmit the new terminal authentication information generated according to the above-mentioned algorithm together with the time information, to the delivery terminal. Accordingly, the delivery terminal may transmit, to the key unit, the new terminal authentication information and time information received from the center server device. The key unit may generate the device authentication information corresponding to the new terminal authentication information according to the same algorithm as in the center server device, with the use of the time information received from the delivery terminal and the key ID registered in advanced in the key unit. Then, the key unit may authenticate the delivery terminal by comparing the terminal authentication information received from the delivery terminal with the device authentication information generated by the key unit. According to this method, the predetermined authentication information can be changed each time the delivery work is carried out, even in the case where the user vehicle is not provided with a device that can communicate with the center server device.

What is claimed is:

1. A trunk share system comprising:
a delivery terminal that is used by a person that carries out delivery work for delivering a delivery article into an interior of a vehicle;
a user terminal that is used by a user of the vehicle;
a first server device that is configured to manage the delivery work for the delivery article; and
a second server device that is configured to manage the vehicle, wherein
the delivery terminal is configured to make a request for issuance of predetermined authentication information for unlocking and locking a door of the vehicle when the predetermined authentication information coincides with stored authentication information stored in the vehicle,
the first server device is configured to make confirmation as to whether the user is a rightful recipient of the delivery article by communicating with the user terminal upon receiving the request for issuance of the predetermined authentication information from the delivery terminal, and to transmit predetermined proof information for proving that the user is the rightful recipient of the delivery article and the request for issuance of the predetermined authentication information to the second server device when the confirmation is successful, and the second server device is configured to acquire the predetermined authentication information based on vehicle information including information for identifying the vehicle, and to transmit the acquired predetermined authentication information to the delivery terminal upon receiving the predetermined proof information and the request for issuance of the predetermined authentication information from the first server device.

2. A method comprising:

making, via a delivery terminal that is used by a person that carries out delivery work for delivering a delivery article into an interior of a vehicle, a request for issuance of predetermined authentication information for unlocking and locking a door of the vehicle when the predetermined authentication information coincides with stored authentication information stored in the vehicle;

making, via a first server device that is configured to manage the delivery work for the delivery article, confirmation as to whether the user is a rightful recipient of the delivery article by communicating with a user terminal that is used by a user of the vehicle upon receiving the request for issuance of the predetermined authentication information from the delivery terminal;

transmitting, via the first server device, predetermined proof information for proving that the user is the rightful recipient of the delivery article and the request for issuance of the predetermined authentication information to the second server device when the confirmation is successful;

acquiring, via a second server device that is configured to manage the vehicle, the predetermined authentication information based on vehicle information including information for identifying the vehicle; and transmitting, via the second server device, the acquired predetermined authentication information to the delivery terminal upon receiving the predetermined proof information and the request for issuance of the predetermined authentication information from the first server device.

* * * * *